United States Patent Office 3,150,716
Patented Sept. 29, 1964

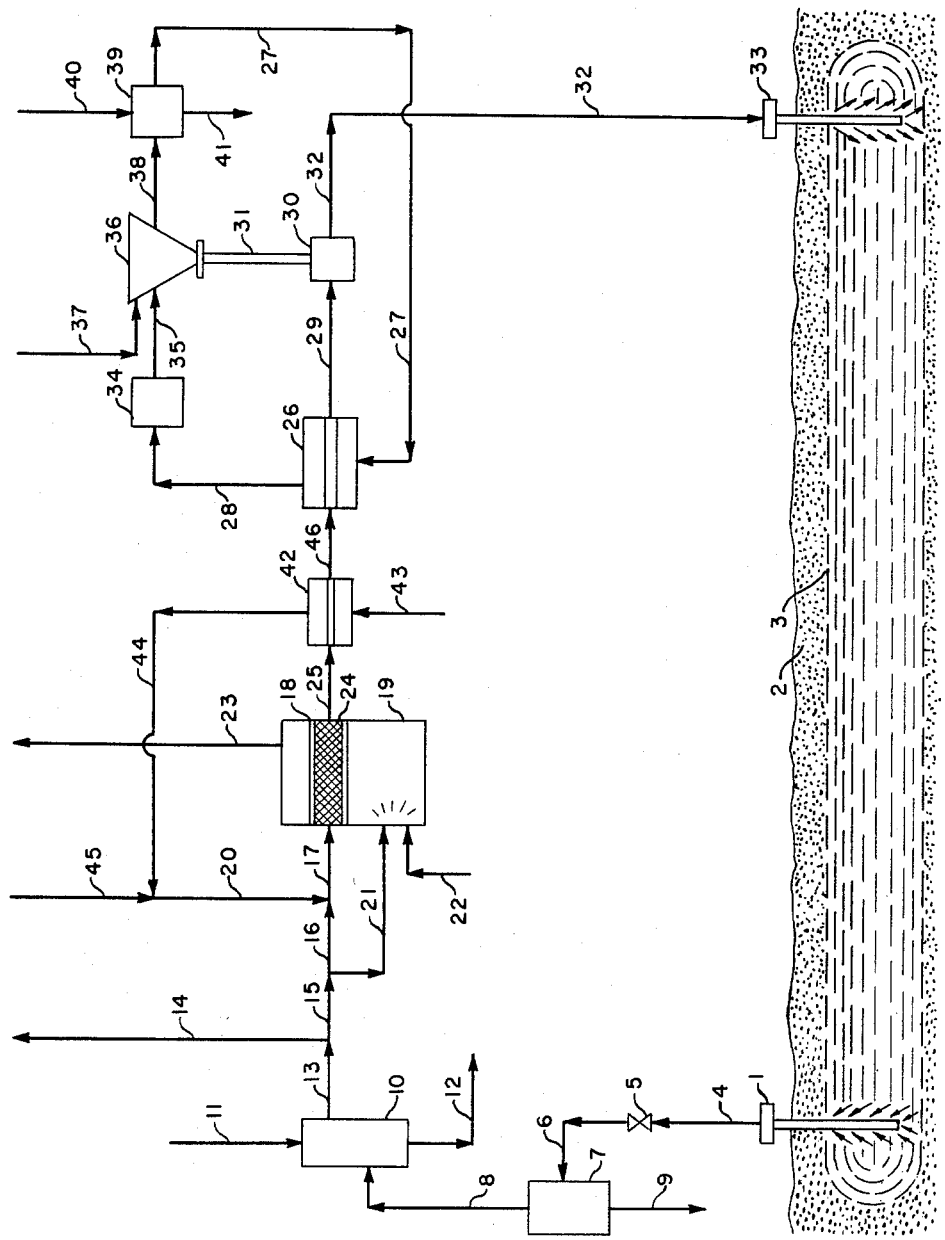

3,150,716
PRESSURIZING OIL FIELDS
Samuel Strelzoff, New York, and George Russell James, Armonk, N.Y., assignors to Chemical Construction Corporation, New York, N.Y., a corporation of Delaware
Filed Oct. 1, 1959, Ser. No. 843,696
2 Claims. (Cl. 166—11)

This invention relates to the maintenance of pressure in oil fields by injection of gas. A process has been developed which uses hydrocarbon reformer gas produced by the reaction of a hydrocarbon with steam for this purpose. The gas phase which results when this gas is injected into the oil field possesses high thermal values. In a preferred embodiment of this invention, a combination process is described which utilizes the thermal energy of the produced gas to provide compression power.

The maintenance of field pressure is a problem often encountered in operating oil fields. The removal of components from the underground formation by means of oil and gas wells sometimes results in a gradual loss of field pressure which in turn causes a decrease in flow rates from the wells. Numerous procedures have been adopted in the petroleum industry to compensate for this condition. These procedures are also employed to revitalize or obtain further production from abandoned or shut-in fields.

One basic approach involves replacement of the component volume of product removed, by another fluid which is injected into the formation and thereby serves to maintain or increase the general pressure level. A second well in the formation, somewhat removed from the producing well, is employed as an injection passage to admit the other fluid.

Among the various fluids which have been employed for this purpose is water. This technique, known as flooding, has produced beneficial results in numerous commercial installations. It should be noted, however, that water injection is usually employed as a last resort, since flooding the formation with water eliminates any possibility of further hydrocarbon recovery from the formation using other techniques. Another consideration is the fact that many oil fields are located in arid or semi-arid areas having a deficiency or scarcity of water.

Numerous gases have been suggested as pressure maintenance agents. Thus, for example, air has been utilized for this purpose. In this case underground combustion takes place and the combustion products, heated by the combustion reactions, serve to maintain field pressure and also to drive extra hydrocarbon values out of the formation because of the elevated temperatures which result. One drawback to this procedure is that the gas phase and other more valuable low-boiling components in the hydrocarbon formation are usually selectively consumed in the combustion process. Another basic objection involves undesirable dilution of the gas phase with inert combustion products which are principally carbon dioxide and water vapor. Thus the thermal value per unit volume of the gas phase is lowered and hence its economic value may be reduced or eliminated. This consideration is especially important when long-distance transportation is involved in marketing the gas phase. The gas phase in most cases is a natural gas composition consisting principally of methane.

Injection of other inert gases such as flue gas or nitrogen from an air separation process has been suggested. This procedure is open to the same objection previously noted in the case of air, namely that the gas phase will become diluted with inerts and consequently its unit thermal value will be lowered.

Finally, the injection of methane or other natural gas derived from an outside source has been practiced. This procedure is advantageous since it also serves to supplement or enrich the gas phase and does not reduce the thermal value of gas produced or in place in the field. However, in numerous cases the availability of natural gas is limited, or the economics of the situation may be unfavorable towards the purchase of natural gas for direct injection.

In the present invention, the pressurizing of oil fields is accomplished by injection of a gas stream produced by the reaction of a hydrocarbon with steam. The product gas stream, consisting principally of carbon monoxide and hydrogen, has a high thermal value and thus does not dilute the oil field with inert gases. Additionally, when methane is employed as the hydrocarbon starting material, 4 volumes of injection gas are produced for each volume of methane consumed. Thus the methane requirement is reduced to ¼ the volume needed when purchased methane is directly injected into the field. Another advantage derived from the use of reformer gas rather than methane for repressurizing arises from the fact that hydrogen is considerably less soluble in liquid hydrocarbons than methane. Thus much less of the reformer gas will dissolve in the liquid phase in the oil field, and hence elevated pressure is more easily maintained. Also, the use of reformer gas for repressurizing will eventually result in the underground storage of a large quantity of hydrogen. Thus the underground gas phase would be of great future value as a source of hydrogen for petro-chemical or other usage.

In a preferred embodiment, a portion of the hydrocarbon stream derived from the field itself is utilized and reacted with steam to provide the injection gas stream. When the field produces a sufficient quantity of gaseous product such as methane in the overall hydrocarbon stream, this gas stream is selectively employed for injection purposes and the more valuable liquid components in the hydrocarbon stream are utilized for refinery operations. An externally-fired catalytic tube reformer such as is described in U.S. Patent No. 2,660,519 is preferably employed in the practice of this invention.

Another novel aspect of this invention involves the utilization of the heat content of the product gas stream. This gas stream is usually produced at an elevated temperature, and in accordance with the present invention the gas stream is cooled in steam generation apparatus and the steam is subsequently utilized to drive a turbine which powers the compressor which serves to pressurize the gas stream prior to injection into the oil field. This combination results in a process with high thermodynamic efficiency and high conservation of thermal values which would otherwise be wasted, if a conventional heat exchanger-cooling tower system or other means were employed for heat removal.

The present invention possesses numerous other advantages, such as elimination of the various drawbacks mentioned in connection with the prior art processes discussed above.

The object of this invention is to provide an improved process for maintaining and increasing the operating pressure in oil fields.

An object of this invention is to provide a process for maintaining and increasing the operating pressure in oil fields which utilizes a component of the field hydrocarbon output to produce a suitable gas stream for re-injection into the oil field.

Another object of this invention is to provide a process which economically produces a large volume of gas for injection into oil fields.

An additional object of this invention is to provide a synthetic gas for oil field injection purposes which will not tend to reduce the unit thermal value of the gas phase in the oil field.

Still another object of this invention is to provide a process for injecting synthetic hydrocarbon-steam reform gas into an oil field which utilizes the thermal energy of the reform gas to provide compression energy for the injection process.

A further object of this invention is to provide a pressurizing process for revitalizing or recovering further hydrocarbon values from abandoned or shut-in oil fields.

These and other objects of this invention will become evident from the description which follows. Referring to the figure, which represents a preferred embodiment of the present invention, producing oil well 1 extends below ground level 2 into underground hydrocarbon formation 3. Well 1 removes hydrocarbon stream 4 containing gas and liquid phases from formation 3. Stream 4 passes through pressure reducing valve 5 via line 6 into separator 7. Separator 7 is a conventional unit such as a baffled gravity separator, and separates the mixed gas-liquid stream 6 into gas phase 8 and liquid phase 9. Stream 9 represents one possible product of the process, and is passed to other product utilization such as a petroleum refinery, not shown.

The gas phase stream 8 usually contains undesirable impurities, principally sulfur compounds. These are removed in conventional gas scrubbing unit 10 which utilizes a scrubbing agent such as monoethanolamine solution to remove sulfur compounds. Lean solution is admitted via 11 and fat sulfur compound-laden solution is withdrawn via 12. When stream 8 is acceptably free of impurity, operations such as gas scrubbing in unit 10 may be omitted.

The purified gas stream leaves unit 10 via 13, and a portion of stream 13 may be withdrawn as product via 14. However, if the subsequent reforming of the balance of stream 13 will not provide sufficient gas volume for pressurizing purposes, the flow direction of stream 14 may be reversed and additional hydrocarbon gas such as natural gas may then be admitted to the process via 14 from outside sources. If the gas from the outside source contains undesirable impurities such as sulfur compounds, the connection to the process would be via line 8, not shown.

The gas stream to be utilized for the reforming process now passes via lines 15, 16, and 17 into catalyst tube 18 of reformer 19. Stream 17 consists of hydrocarbon gas mixed with the proper proportion of steam, admitted via 20. This input steam, line 20, may be partially or totally derived from a later stage of the process via line 44, with additional steam admitted from outside source via 45 if necessary. A portion of stream 15 may be utilized via line 21 for the external firing in reformer 19. In this case stream 21 is burned with air admitted via 22 to provide the heat and proper temperature level for the reforming reaction within tube 18. Usually a temperature of 1000° F.–1800° F. is required in unit 19. It should be recognized that stream 21 is optional, other combustible gas streams or thermal sources may be employed for external firing in reformer 19. Flue gases derived from the combustion of stream 21 pass to a stack via 23.

Catalyst layer or bed 24 is provided within tube 18 of reformer 19. As the mixed stream 17 containing steam and gaseous hydrocarbons, such as methane, passes through tube 18, a catalytic reaction takes place between the hydrocarbon and steam resulting in the formation of carbon monoxide and hydrogen. The resulting product gas stream 25 leaves reformer 19 at an elevated temperature, usually about 800° F. to 1700° F., and is first cooled in steam generation means 42. Unit 42 is preferably a high-pressure steam boiler, with condensate water passed in via 43 and generated steam recycling to the reformer via 44. The partially cooled product gas stream leaves unit 42 via 46 and is further cooled in steam generation means 26. Unit 26 is preferably a steam boiler, with condensate water passed in via 27 and generator steam leaving via 28. The cooled product gas stream leaves unit 26 via 29 and is compressed to proper elevated pressure in compression means 30. Unit 30 is a suitable rotary centrifugal or reciprocating gas compressor, powered by shaft 31. The product gas stream, now at elevated pressure, passes via 32 into well 33 or any other suitable injection passage which connects into the underground hydrocarbon formation 3. Thus the product gas stream 32 passes into formation 3 and serves to maintain or increase the pressure level therein.

Returning to steam boiler 26, the generated steam, line 28, passes first through optional heater unit 34 which may serve to superheat the steam. The steam in any case now passes via line 35 through steam turbine 36. Additional steam from other sources may also be passed through turbine 36 via line 37. The steam feed from lines 35 and 37 drives turbine 36 which in turn transmits power through shaft 31 into gas compressor 30. The exhaust steam leaves turbine 36 via 38 and is condensed in cooler 39 and recycled via 27 as liquid condensate water. Cooler 39 uses cooling water admitted via 40 and exiting via 41 to condense exhaust steam in line 38, or in areas of water shortage unit 39 may be an air condenser in which case stream 40 would be a fan-driven air stream.

The system represented by steam boiler 26, compressor 30, turbine 36 and related units represents a preferred embodiment of the present invention yielding maximum thermal efficiency. In some cases it could be found more suitable in terms of capital investment to provide merely a conventional cooler for reducing the temperature of line 25, followed by a compressor driven exclusively by outside power sources such as an electric motor or gas turbine. Conceivably a combustion gas turbine could be provided as a power source, which would utilize a portion of hydrocarbon gas stream 14 for turbine power.

The concepts of the present invention may be utilized in a variety of practical circumstances in addition to those previously described. Thus in some cases natural gas injection is uneconomical due to leakage from the formation. Injection of a mixed carbon monoxide-hydrogen gas stream in accordance with the present invention to supplement or maintain the natural gas within the formation would serve to inexpensively offset leakage losses.

In many oil fields expensive mechanical pumping is presently required for suitable output flow rates. These formations in some cases would produce crude oil commercially without pumping if sufficient gas was available to maintain a high formation pressure. The process of the present invention could be economically applicable in this circumstance.

Similarly, other fields produce only enough natural gas for re-pressurizing. The process of the present invention would allow the maintenance of field pressure using only a small fraction of the total gas supply, with the balance then being available for sale.

Finally, it should be noted that the present invention provides a gas which could be utilized to balance combustion and overcome other problems now encountered in in situ underground combustion installations. This practice uses air injection to produce heat and maintain pressure and was described supra.

Although the present invention was described in terms of catalytic reforming of natural gas, suitable process modifications well known in the art could be employed whereby other hydrocarbons, including liquid oils such as residual oil or even solids such as coal, could be reacted with steam to provide the carbon monoxide-hydrogen injection gas stream.

The present invention is of course applicable to pressure maintenance in natural gas fields. Thus a total gas stream would be removed from the field, a portion transmitted to market, and the balance reformed in accordance with the present invention and returned to the gas field as a mixed carbon monoxide-hydrogen stream for pressure maintenance.

The above description of a preferred embodiment should not be construed to limit the scope of the process teaching of the present invention, since other modifications within the scope of the present invention will occur to those skilled in the art.

An example of a commercial application of the present invention will now be described.

*Example*

Natural gas was recovered from an oil field at the rate of 232.4 million standard cubic feet per day (s.c.f.d.). After pressure reduction and separation from the liquid phase, the gas stream was passed at 300 p.s.i.g. and 100° F. to a sulfur removal unit which scrubbed the gas stream free of sulfur using monoethanolamine solution. Eventual sulfur recovery as S was 318.0 metric tons per day.

The purified natural gas was divided into two streams. One stream, consisting of 127 million s.c.f.d., was passed to market at 280 p.s.i.g. and 100° F. The balance of the natural gas was reacted with steam in an externally fired reformer, except for a side stream which was used for fuel. The reformer gas was produced at a rate of 232.4 million s.c.f.d., equal to the total volume of natural gas withdrawn from the field. After utilization for steam generation, the reformer gas was passed to compression at 220 p.s.i.g. and 100° F., compressed to 2500 p.s.i.g. and recycled to the oil field. The heating value of the recycled reformer gas was about 30% of the heating value (B.t.u./ft.$^3$) of the original natural gas. The original natural gas stream contained 84% methane with the balance primarily higher hydrocarbons, while the recycled reformer gas contained about 74% hydrogen, 7% carbon monoxide and 5% methane, with the balance consisting of carbon dioxide and other inerts.

In the utilization of hot-reformer gas for steam generation, the gas at an initial temperature of 1000° F. was passed through a high pressure boiler and generated 250 p.s.i.g. steam. The partially cooled gas was then used to preheat boiler feed water for the 250 p.s.i.g. steam boiler, and finally used to generate 40 p.s.i.g. steam in a low pressure boiler. The generated steam was superheated to 740° F. in an externally fired superheater which utilized a portion of the natural gas as fuel. The superheated steam was then used to drive a 47,000 H.P. steam turbine which in turn furnished the shaft drive for the centrifugal compressor which compressed the recycle reformer gas from 220 p.s.i.g. to 2500 p.s.i.g. The exhaust steam was condensed in an air condenser and recycled at 150° F.

It should be noted that the reformer gas produced in the above example contained a considerably greater proportion of hydrogen, relative to carbon monoxide, than would be produced merely by the reaction of methane with steam. A considerable excess of steam was employed in the reformer feed, and consequently a portion of the carbon monoxide initially produced was subsequently oxidized to carbon dioxide in the reformer by reaction with steam, thus producing more free hydrogen and reducing the final proportion of carbon monoxide in the gas. In practice, the amount of carbon monoxide reaction with steam may be modified as desired by control of reaction conditions and initial steam-gas ratio.

We claim:
1. Process for producing and maintaining elevated pressure within an underground fluid hydrocarbon formation having a gas phase whereby increased recovery of fluid hydrocarbon is obtained from a production well, comprising withdrawing a gaseous hydrocarbon stream from said underground formation, catalytically reacting said gaseous hydrocarbon stream with steam at elevated temperature to produce a hot gaseous product steam principally comprising carbon monoxide and hydrogen, cooling said hot gaseous product stream by indirect heat exchange with water whereby steam is generated, compressing said cooled product stream in mechanical compression means to an elevated pressure, discharging said compressed product stream into said underground fluid hydrocarbon formation through an injection well spaced from said production well, whereby elevated pressure is produced and maintained in said formation, and expanding said generated steam through power producing means connected to said compression means, whereby said generated steam provides at least a portion of the power requirement of said compression means.

2. Process of claim 1, in which said power producing means is a steam turbine.

References Cited in the file of this patent

UNITED STATES PATENTS

| | | |
|---|---|---|
| 1,249,232 | Squires | Dec. 4, 1917 |
| 2,642,943 | Smith | June 23, 1953 |
| 2,708,481 | Allen | May 17, 1955 |
| 2,724,437 | Whorton et al. | Nov. 22, 1955 |
| 2,734,578 | Walter | Feb. 14, 1956 |
| 2,767,791 | Van Dijck | Oct. 23, 1956 |